G. STEVENSON.

Improvement in Rubber-Nipples.

No. 131,130.            Patented Sep. 3, 1872.

Witnesses:
Henry N. Miller
L. Evert

Inventor.
George Stevenson
per Alexander Mason
Attorneys.

UNITED STATES PATENT OFFICE.

GEORGE STEVENSON, OF ZIONSVILLE, INDIANA.

IMPROVEMENT IN RUBBER NIPPLES.

Specification forming part of Letters Patent No. 131,130, dated September 3, 1872.

*To all whom it may concern:*

Be it known that I, GEORGE STEVENSON, of Zionsville, in the county of Boone and in the State of Indiana, have invented certain new and useful Improvements in Rubber Nipples; and do hereby declare that the following is a full, clear, and exact description thereof, reference being had to the accompanying drawing and to the letters of reference marked thereon making a part of this specification.

The nature of my invention consists in a a rubber nipple, having its outer end divided by one or more partitions or cross-bars into two or more chambers, each chamber having a hole or outlet, as will be hereinafter more fully set forth.

In order to enable others skilled in the art to which my invention appertains to make and use the same, I will now proceed to describe its construction and operation, referring to the annexed drawing, in which—

Figure 1:
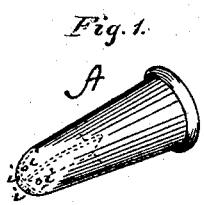
Figure 2:
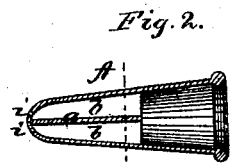

Figure 1 is a perspective view; Fig. 2, a longitudinal section; and Fig. 3, a transverse section of my rubber nipple.

Figure 3:
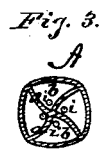

A represents an ordinary rubber nipple, which I provide at its outer end with partitions $a\ a$ of rubber, forming chambers $b\ b$, as shown in Figs. 2 and 3. I do not confine myself to any particular number of these partitions and chambers; they may be of any desired number. Each chamber $b$ has a hole or outlet, $i$, in the end of the nipple. These partitions or cross-bars $a\ a$ answer a double purpose. They hold the nipple out to a round and natural position, and prevent it from pressing flat when the child is drawing the milk from it. They also divide the inner side of the nipple into chambers, thereby dividing the body of the milk, whereby the flow of the milk is made more regular and constant, with less effort of the child; hence, preventing the child from strangling, as is often the case with the old-fashioned nipples.

Having thus fully described my invention, what I claim as new, and desire to secure by Letters Patent, is—

A rubber nipple, having at its outer end one or more interior partitions or cross-bars, substantially as and for the purposes herein specified.

In testimony that I claim the foregoing I have hereunto set my hand this 31st day of July, 1872.

GEORGE STEVENSON.

Witnesses:
W. C. VANCE,
W. M. MAINS.